United States Patent [19]
Kalen

[11] 3,820,210
[45] June 28, 1974

[54] BURNISHING TOOL FOR A FLAT SURFACE
[75] Inventor: Stuart E. Kalen, Sterling Heights, Mich.
[73] Assignee: Cogsdill Tool Products, Inc., Farmington, Mich.
[22] Filed: Nov. 10, 1972
[21] Appl. No.: 305,458

[52] U.S. Cl. .................. 29/90, 51/170 T, 72/76
[51] Int. Cl. ... B21c 37/30, B24b 23/00, B21b 13/20
[58] Field of Search ............ 29/90; 72/76; 51/170 T

[56] References Cited
UNITED STATES PATENTS

| 845,730 | 2/1907 | Marshall | 29/90 |
|---|---|---|---|
| 921,739 | 5/1909 | Rieske | 29/90 |
| 1,312,333 | 8/1919 | Lebow | 29/90 |
| 1,516,269 | 11/1924 | Drissner | 29/90 |
| 1,829,373 | 10/1931 | Samson | 29/90 |
| 2,993,311 | 7/1961 | West | 51/170 T |
| 3,059,315 | 10/1962 | Chambers | 29/90 |
| 3,194,042 | 7/1965 | Adam | 72/76 |

FOREIGN PATENTS OR APPLICATIONS

| 678,070 | 12/1929 | France | 29/90 |
|---|---|---|---|
| 864,956 | 2/1941 | France | 29/90 |

Primary Examiner—Harrison L. Hinson
Attorney, Agent, or Firm—Harness, Dickey & Pierce

[57] ABSTRACT

A burnishing tool has a head with an end face constructed to burnish flat surfaces through the driving of the head and the rollers or balls thereon which engage the surface to be burnished as the head is rotated and advanced thereover. The head is supported on a spindle through a universal joint which permits the rollers and balls to engage the surface with like pressures. A flange on the spindle has an aperture into which a pin supported by the head extends to produce a drive therebetween.

6 Claims, 3 Drawing Figures

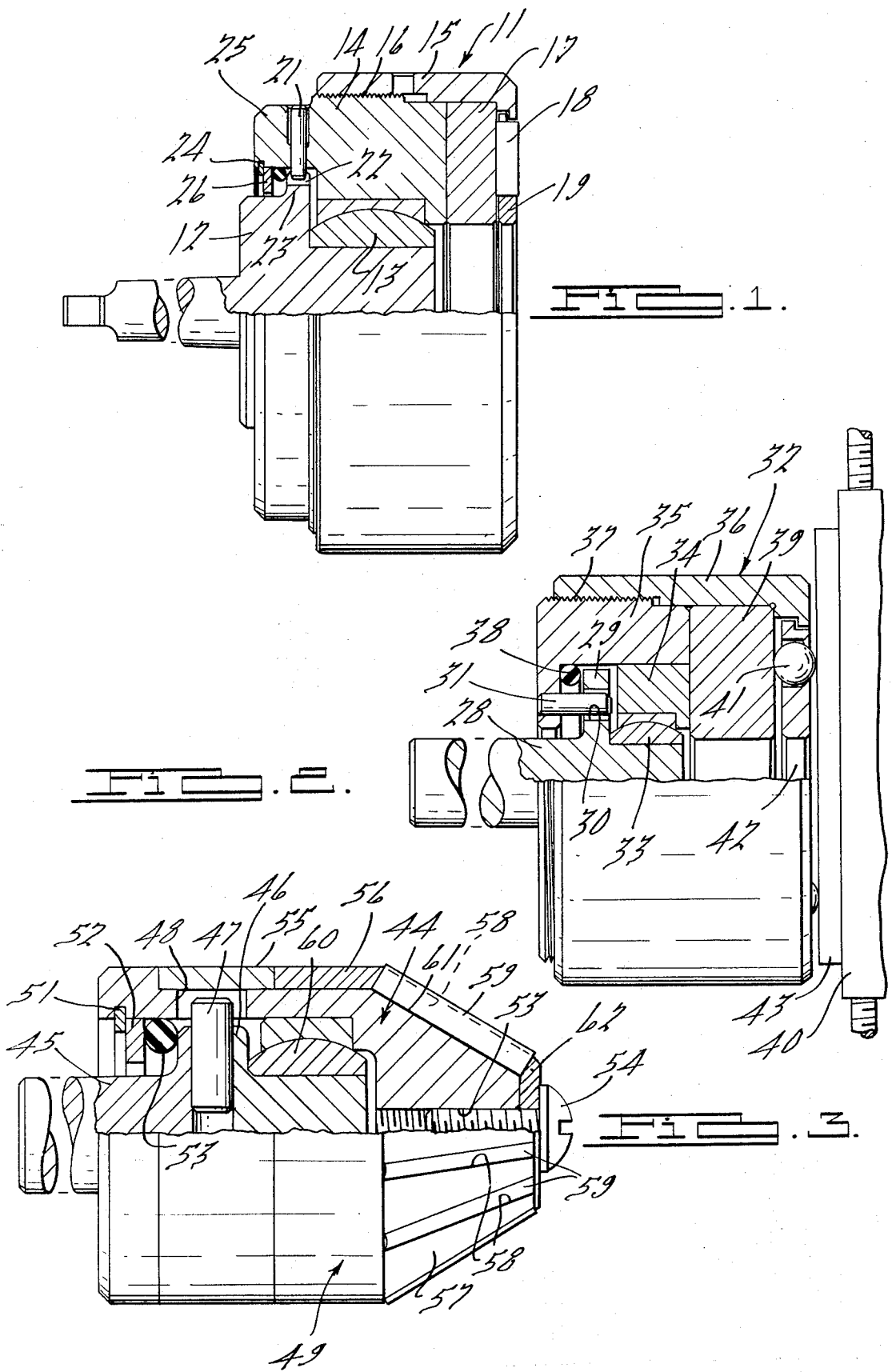

BURNISHING TOOL FOR A FLAT SURFACE

BACKGROUND OF THE INVENTION

Reference may be had to J. E. Gustkey, U.S. Pat. No. 3,444,714 issued May 20, 1969 and that to W. G. Huber et al., U.S. Pat. No. 3,320,652 issued May 23, 1967 to show the prior art on burnishing tools.

RELATED APPLICATIONS

Reference may be had to S. E. Kalen, application Ser. No. 305,457, filed Nov. 10, 1972, for "BURNISHING TOOL FOR AN ARCUATE SURACE," and to S. E. Kalen, application Ser. No. 182,360, filed Sept. 21, 1971, for "FINISHING DEVICE FOR INTERNAL AND EXTERNAL SURFACES" which were assigned to the assignee of the present invention.

SUMMARY OF THE INVENTION

The invention pertains to a burnishing tool having a driven spindle for a head which is mounted thereon through a universal joint having a driving relation therebetween. The head has a plurality of rollers or balls in engagement with a hardened flat cam surface when free to engage the surface to be burnished with like force in view of the presence of the universal joint. A flange on the spindle is positioned by an O-ring which stabilizes the head and returns it to its normal position after being deflected. A tapered arbor may be similarly supported on a spindle for universal movement in driving relation thereto having a plurality of rollers on the sloping portion thereof for burnishing the flat surface of a tapered hole to size and produce a taper thereto. The driving of the head produces a line contact between the rollers and the surface of the tapered hole.

BRIEF DESCRIPTION OF THE DRAWING

FIG. 1 is a broken view of a burnishing tool with a part in section embodying features of the present invention;

FIG. 2 is a view of structure, similar to that illustrated in FIG. 1, showing another form thereof, and FIG. 3 is a view of structure, similar to that illustrated in FIGS. 1 and 2 showing still another form of the invention.

DESCRIPTION OF THE PREFERRED EMBODIMENTS

In FIG. 1, a burnishing tool is illustrated having a drive spindle 12 containing a bearing 13 mounted on a bushing 14 on which a retainer 15 is secured by the threads 16. The retainer supports a roller cam 17 against which a plurality of rollers 18, mounted in a cage 19, engage. The bushing 14 has a pin 21 fixed thereto with the end extending into a aperture 22 in a flange 23 projecting outwardly from the spindle 12. The bushing 14 has a split spring ring 24 secured in a slot in the end 25 thereof for supporting a washer 26 which retains an O-ring 27 in engagement with the flange 23 for stabilizing the head on the spindle. When the spindle is driven in rotation the head is advanced with a predetermined pressure against the flat surface of the workpiece and as the engaged rollers are driven in rotation the head is relatively advanced to cover the flat area which is to be burnished.

In FIG. 2, a similar tool is illustrated that having a spindle 28 containing a flange 29 having an aperture 30 in which a pin 31 secured in a housing 35 of a head 32 extends. The head 32 has a bearing 33 supported in a bushing 34 within the housing 35 on which a retainer 36 is secured by threads 37. An O-ring 38 between the housing 35 and flange 29 stabilizes the head 32 on the spindle but permits it to deflect under pressure. The retainer supports a roller cam 39 against which a plurality of balls 41 roll when supported in a cage 42 and driven in rotation. The balls produce a circular burnished path which is advanced over the flat area of a workpiece 43 to be burnished mounted on a leadscrew-operated table 40 to spread the burnishing operation to all points of the workpiece. Approximately one dozen balls are employed within the cage 42 and any number of the balls 41 or rollers 18 may be employed depending upon the size of the workpiece and the balls and rollers to operate thereon.

In FIG. 3, a further form of the invention is illustrated that wherein a head 49 has an arbor 44 supported therein on a spindle 45 having a flange 46 in which a pin 47 is secured to extend within an aperture 48 in the arbor 44. The interior of the arbor has an annular slot in which a split spring ring 51 is secured to support a washer 52 against an O-ring 53 which is in engagement with the flange 46 for stabilizing the head 49 on the spindle. The arbor 44 has a threaded aperture 53 in which a screw 54 is threaded to secure a sleeve 55 and a roller cage 56 thereon. The roller cage has a truncated conical end 57 containing converging cylindrical slots 58 for cylindrical rollers 59 that roll on a roller cam surface 61. A washer 62 on the screw engages the bottom ends of the roller cage 56 and retains the rollers within the slots 58. A bearing unit 60 is secured to the lower end of the spindle 45 and to the arbor 44 to permit the angular movement of the head 49 on the end of the spindle. In this arrangement, the rollers engage the surface of a chamfered or truncated aperture with a line engagement to burnish the truncated surface to an exact truncated conical form with a bright finish as the spindle 45 is driven in rotation and the head is free to oscillate relative thereto.

I claim:

1. In a burnishing device, a rotatable spindle having a body, a hollow element having a truncated spherical outer surface on said spindle body, a ring having a concave inner spherical surface mated with said spherical surface of said element, a head in which said ring is fixedly supported for universal movement on said spindle, a cage on said head, roller means supported by said cage, and a pin and slot connection between said spindle and head to provide a drive therebetween when the axis of the head and spindle are aligned or in angular relation to each other.

2. In a burnishing device as recited in claim 1, wherein the roller means are cylindrical rollers of predetermined length and diameter supported within said cage.

3. In a burnishing device as recited in claim 1, wherein the roller means are balls which are supported in the cage and have point contact with the surface to be burnished.

4. In a burnishing device as recited in claim 1, wherein said head has a truncated conical end, a conical cage supported on said conical end, rollers within said cage, and a screw having a washer thereon which closes the end of the cage for retaining the rollers therein and for supporting the cage on the arbor.

5. In a burnishing device as recited in claim 4, wherein the rollers are of cylindrical form.

6. In a burnishing device as recited in claim 1, wherein a flange extends outwardly on said arbor, and an elastomeric O-ring secured within the head for engaging said flange and retaining the head against free movement on said spindle.

* * * * *